United States Patent
Mantua et al.

[11] Patent Number: 6,009,909
[45] Date of Patent: Jan. 4, 2000

[54] METHOD AND APPARATUS FOR FLUID TRANSPORT

[75] Inventors: James P. Mantua, Royal Oak; Yousef Y. Vaid, Ann Arbor; Ronald F. Kline, Rochester Hills, all of Mich.

[73] Assignee: DaimlerChrysler Corporation, Auburn Hills, Mich.

[21] Appl. No.: 08/987,437

[22] Filed: Dec. 9, 1997

[51] Int. Cl.[7] .............................. F16L 11/12; F16L 11/10; F16L 11/14
[52] U.S. Cl. .......................... 138/118; 138/121; 138/172
[58] Field of Search .................................. 138/122, 121, 138/172, 118; 285/14, 226

[56] References Cited

U.S. PATENT DOCUMENTS

| | | |
|---|---|---|
| 1,778,040 | 10/1930 | Rutherford ............................... 138/172 |
| 3,883,267 | 5/1975 | McCumber ............................... 138/172 |
| 4,172,474 | 10/1979 | Stahl ....................................... 138/122 |
| 4,927,191 | 5/1990 | Mikol ...................................... 285/226 |
| 4,996,202 | 2/1991 | Bryan et al. ............................. 138/122 |
| 5,259,418 | 11/1993 | Hamrick .................................. 138/122 |
| 5,305,799 | 4/1994 | Dal Palu ................................. 138/122 |
| 5,311,753 | 5/1994 | Kanao ..................................... 138/122 |
| 5,393,260 | 2/1995 | Barth ...................................... 138/122 |
| 5,720,656 | 2/1998 | Savage .................................... 138/121 |
| 5,803,506 | 9/1998 | Argersinger et al. ..................... 285/14 |

Primary Examiner—Andres Kashnikow
Assistant Examiner—Davis Hwu
Attorney, Agent, or Firm—James R. Yee

[57] ABSTRACT

A hose for transporting a fluid through a controlled bend and method of using same. In one application, the hose is adapted for incorporation into an automotive vehicle and has a generally straight portion and a bent portion. The bent portion is capable of maintaining a 90 degree bend without causing an "S" shape and provides a visually pleasing appearance.

17 Claims, 3 Drawing Sheets

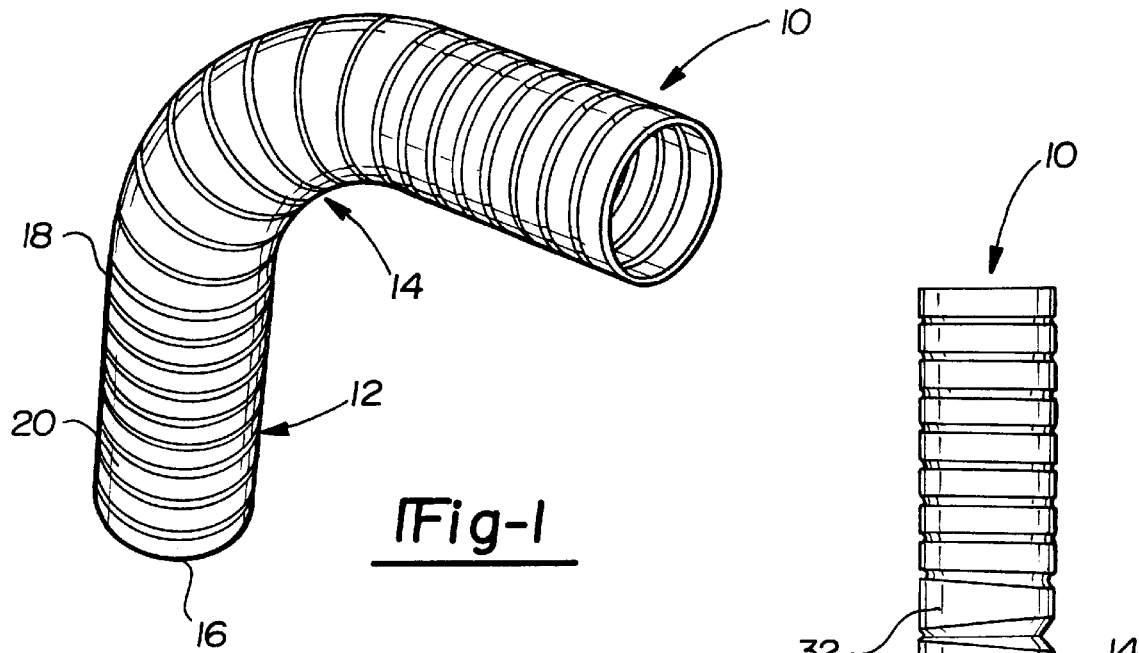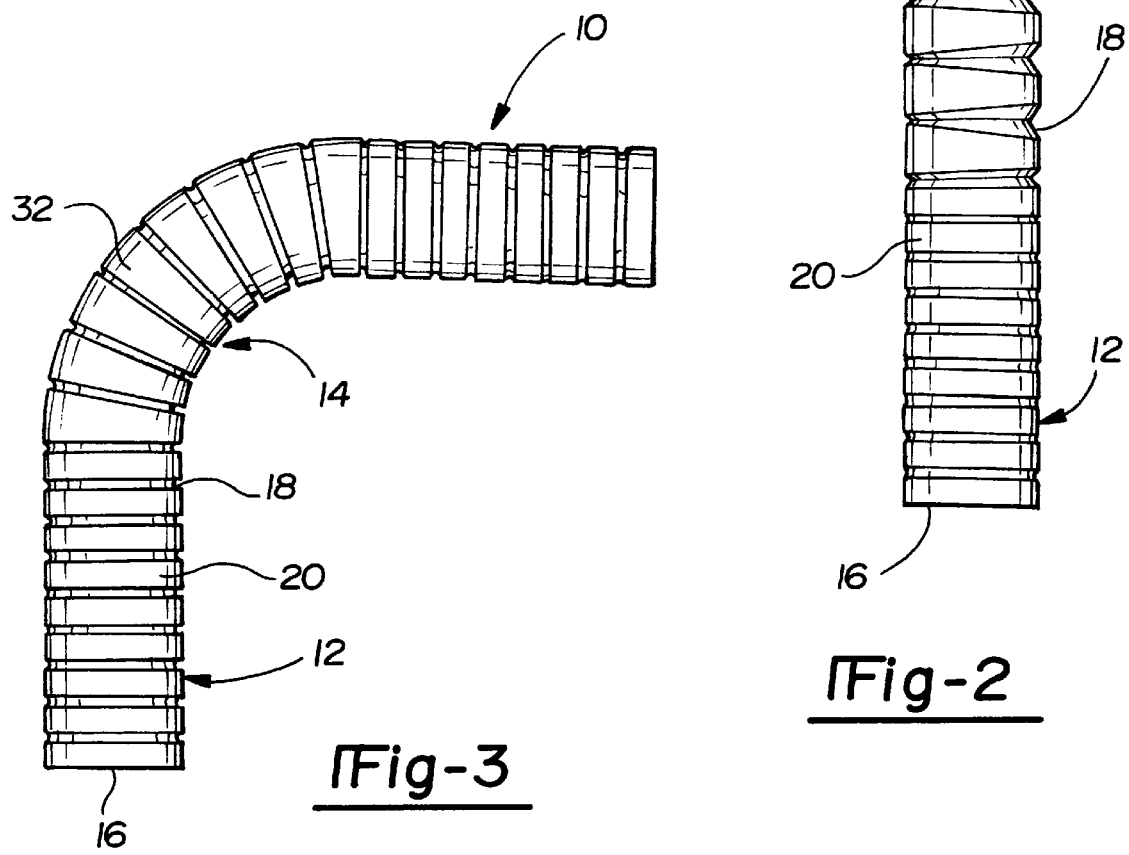

METHOD AND APPARATUS FOR FLUID TRANSPORT

BACKGROUND OF THE INVENTION

1. Technical Field

The present invention relates generally to a fluid transport apparatus, and more particularly, a hose for air transport into an automotive vehicle engine.

2. Discussion

As space becomes more limited in automotive vehicle engine compartments, a need has developed to reduce the volume occupied by engine components external to the engine block. One such component is a clean air hose used for an air induction system. Previously, it has been popular to use a constant bellowed tube (such as a plastic tube) having a plurality of individual units connected at their ends and having a plurality of folds or pleats to allow for bending. The units have a generally constant length dimension about their periphery. While such structure permits for bending of the base, it also possesses potential drawbacks of varying the shape of the fluid path defined in the interior of the tube. Accordingly, it is desired to have a hose for attachment to a vehicle engine that permits for bending to fit within the vehicle engine compartment. It is also desired that the hose be able to maintain its bend shape. It is also desired to have a generally constant shape fluid flow path along the length of the hose. Finally, it is desired that the hose be able to bend in a 90 degree fashion without taking on an "S" shape.

SUMMARY OF THE INVENTION

The disadvantages of the prior art are overcome and the desired attributes of a fluid transport hose for an automotive vehicle engine are achieved by a hose and method according to the present invention. The hose has a first generally straight portion and a second portion having a first end and a second end, which is connected at its first end to an end of the generally straight portion. The second portion has a bellows structure and is capable of maintaining a bend having a substantially constant inside diameter and shape throughout the bend. A plurality of connected repeating units define the bellows structure. The units have a central portion that is generally tubular and has a varying length dimension about its periphery defined so that the length of the central portion gradually decreases to a minimum as the wall defining the central portion approaches the desired axis of bending. Such a unit has at least one end portion that includes structure for permitting controlled bending about the bending axis while preferably maintaining a substantially constant internal transverse cross-sectional diameter and shape within the resulting bend. In the method of the present invention, a hose as above is connected to an automotive vehicle engine.

BRIEF DESCRIPTION OF THE DRAWINGS

Other features and advantages of the invention will be evident from the following detailed description of the preferred embodiment of the invention and the accompany drawings wherein:

FIG. 1 is a perspective view of a bent hose.

FIG. 2 is a side elevational view of the hose of FIG. 1, before bending.

FIG. 3 is a side elevational view of the hose of FIG. 1.

DETAILED DESCRIPTION OF THE PREFERRED EMBODIMENT

Figure 4:
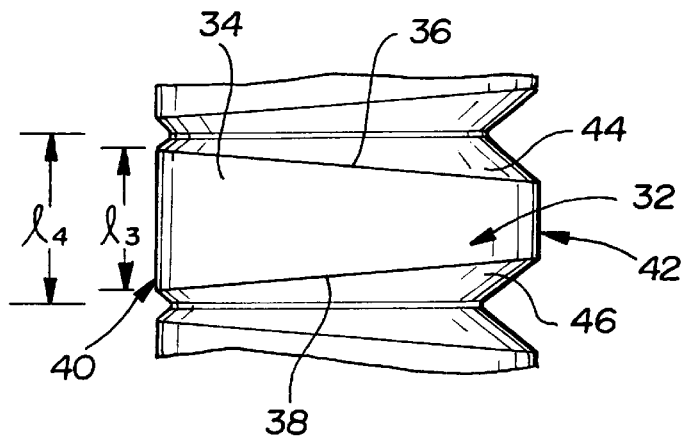
FIG. 4 is an enlarged elevational view of an illustrative unit from one portion of the hose of FIG. 1.

With initial reference to FIGS. 1–3, hose 10 (constructed in accordance with a preferred embodiment of the present invention) is shown to include a first hose portion 12 that is generally straight and a second hose portion 14 for permitting controlled bending. The first hose portion 12 has an open end 16 and an end connected with the second hose portion 14 at an end of the second hose portion 14 to define a juncture 18.

Figure 5:
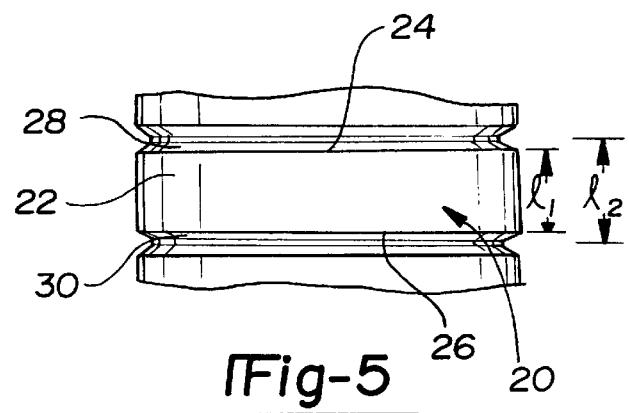
FIG. 5 is an enlarged elevational view of an illustrative unit from another portion of the hose of FIG. 1.

The first portion 12 is tubular and bellowed. It includes a plurality of repeating units (illustratively shown by reference numeral 20, see also FIG. 5) connected to each other along the longitudinal axis of the first portion 12. As shown in FIG. 5, the repeating units 20 have a central portion 22 having a first central portion end 24 and a second central portion end 26, and a generally constant length dimension ($l_1$) about the periphery of the central portion 22, as measured from the first central portion end 24 to the second central portion end 26. At the respective first and second central portion ends 24 and 26, there are adjoining respective end portions 28 and 30 connected to the central portion 22. The adjoining end portions 28 and 30 have a transverse cross-sectional diameter that is different from the transverse cross-sectional diameter of the central portion. Each unit has a length ($l_2$) that is generally constant about the periphery. As shown in FIG. 5, the exemplary embodiment includes end portions 28 and 30, which project inwardly about the longitudinal axis.

As shown in FIGS. 1–3, the second hose portion 14 includes a plurality of repeating tubular units 32 to define a second bellows configuration having a different bellows shape than the bellows in the first portion 12. Referring also to FIG. 4, the repeating units have a central portion 34 (and first and second central portion ends 36 and 38, respectively), which has a varying length dimension ($l_3$), even though the length of the unit as a whole (($l_4$); including the end portions) is generally constant about the periphery. The length ($l_3$) of the central portion 34 of unit 32 gradually decreases moving from the outboard portion 40 toward the inboard portion 42. First and second end portions 44 and 46 of unit 32 are defined by a generally frusto-conical wall in each.

Figure 6:
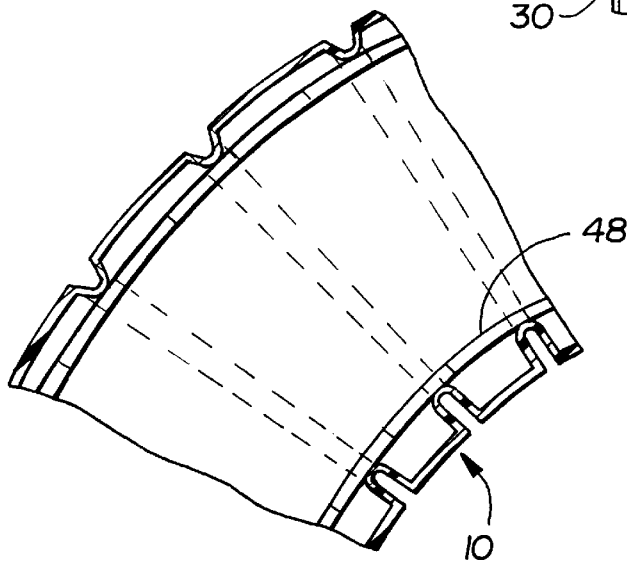
FIG. 6 is an enlarged sectional view of a bent portion of the hose of FIG. 1.
Figure 7:
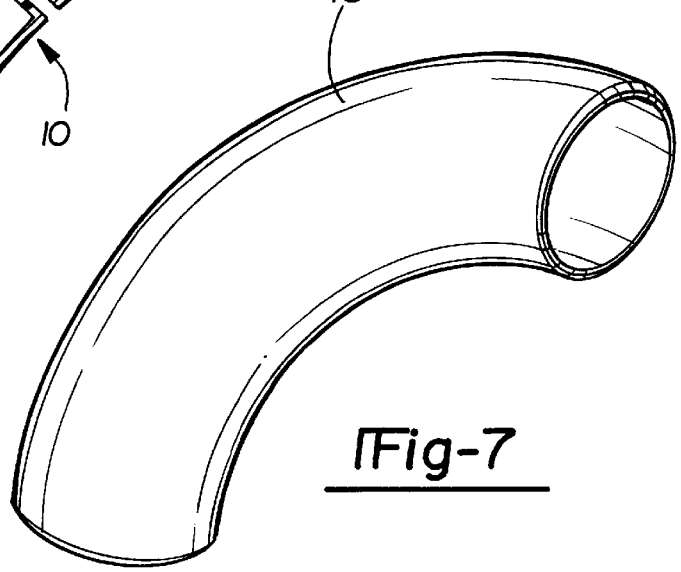
FIG. 7 is a perspective view of an insert for maintaining a bend in a portion of a hose.

The first and second end portions 44 and 46, when connected to other units (either unit 20 or unit 32) as with the end portions of the units 20 of the first hose portion 12, define pleats that permit controlled bending about a bending axis as shown in FIGS. 1 and 3. To help maintain a suitable bend in the hose, a suitable tubular insert 48 may be employed. FIGS. 6 and 7 show an example of an elbow tube insert 48 (e.g., a 90° elbow) over-molded in place (see FIG. 6) to achieve the desired bend.

Figure 8A:
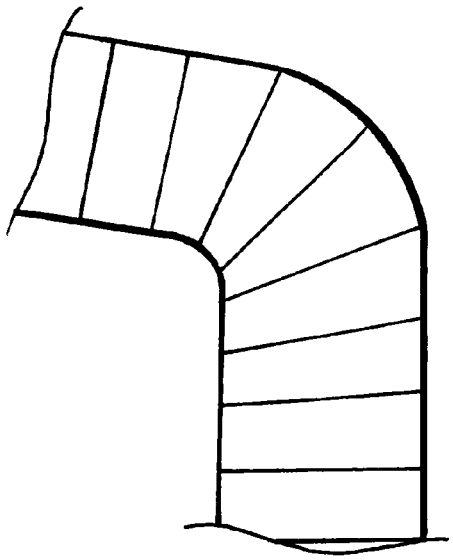
FIG. 8 is a schematic cut-away view showing shapes of bent hoses.
Figure 8B:
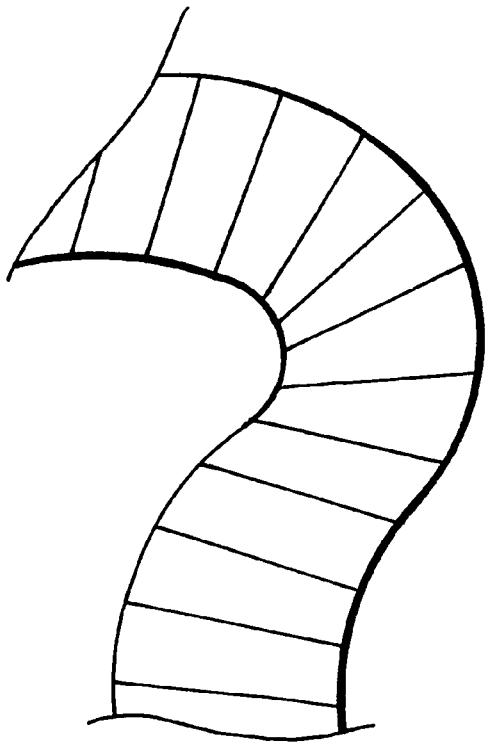

The second hose portion 14 allows the hose to bend as desired (e.g., approximately 90°; see FIGS. 1 and 3) without taking on an "S" shape (see FIG. 8, "A" showing the curve achieved by the present invention, "B", the "S" shape conventional hoses give while bent) while maintaining generally even spacing across certain visible surfaces. The interior surface is relatively constant cross-sectional diameter and shape to help reduce fluid flow restriction.

Material choice for the hose components is not critical. Suitable plastic materials may be employed. In the exemplary embodiment, the hose 10 is unitarily constructed. Alternatively, the components of the hose 10 can be independently constructed and suitably joined. In service, for one preferred embodiment, the hose is connected at one of its ends to an automotive vehicle engine for permitting induction of air received from the end not connected to the engine.

Reasonable modifications and variations of the above-described illustrative embodiment of the invention are possible without departing from the spirit and scope of the invention, which is defined in the appended claims. For example, the hose may include a plurality of bendable portions or a single bend portion connected at its ends to one or more straight portions, such as the two straight portions shown in FIGS. 1–3.

We claim:

1. A hose for ducting a fluid through a controlled bend about a predetermined axis, the hose defining an inner perimeter and an outer perimeter when bent about the predetermined axis, the hose comprising a plurality of repeating units, each repeating unit of said plurality of repeating units including a central portion and a pair of end portions, adjacent end portions of each pair of adjacent repeating units cooperating to define a pleat, each central portion having a first length along said outer perimeter and a second length along said inner perimeter, said first length being longer than said second length.

2. The hose for ducting a fluid through a controlled bend of claim 1, wherein said central portion linearly tapers between said first length and said second length.

3. The hose for ducting a fluid through a controlled bend of claim 1, wherein said hose is tubular.

4. The hose for ducting a fluid through a controlled bend of claim 1, further comprising an elbow inserted within said plurality of repeating units for maintaining the controlled bend.

5. The hose for ducting a fluid through a controlled bend of claim 1, wherein the hose is bendable between a first position and a second position such that the hose is linearly elongated in said first position and bent about said predetermined axis in said second position.

6. The hose for ducting a fluid through a controlled bend of claim 5, wherein each pleat has a third length along said outer perimeter and a fourth length along said inner perimeter, said third length being substantially greater than said fourth length when the hose is in said first position.

7. The hose for ducting a fluid through a controlled bend of claim 5, wherein each pleat has a third length along said outer perimeter and a fourth length along said inner perimeter, said third length being substantially equal to said fourth length when the hose is in said second position.

8. The hose for ducting a fluid through a controlled bend of claim 5, wherein each pleat has a third length along said outer perimeter and a fourth length along said inner perimeter, said fourth length being substantially constant as the hose is bent between said first position and said second position.

9. A hose for ducting fluid through a controlled bend about a predetermined axis, the hose comprising:

a first hose end;

a second hose end; and a central hose section connecting said first hose end and said second hose end, said central hose section defining an inner perimeter and an outer perimeter when bent about the predetermined axis, said central hose section including a plurality of repeating units, each repeating unit of said plurality of repeating units including a central portion and a pair of end portions, adjacent end portions of each pair of adjacent repeating units cooperating to define a pleat, each central portion having a first length along said outer perimeter and a second length along said inner perimeter, said first length being longer than said second length.

10. The hose for ducting a fluid through a controlled bend of claim 9, wherein said central portion linearly tapers between said first length and said second length.

11. The hose for ducting a fluid through a controlled bend of claim 9, wherein said hose is tubular.

12. The hose for ducting a fluid through a controlled bend of claim 9, further comprising an elbow inserted within said plurality of repeating units for maintaining the controlled bend.

13. The hose for ducting a fluid through a controlled bend of claim 9, wherein said central hose section is bendable between a first position and a second position such that the hose is linearly elongated in said first position and bent about said predetermined axis in said second position.

14. The hose for ducting a fluid through a controlled bend of claim 13, wherein each pleat has a third length along said outer perimeter and a fourth length along said inner perimeter, said third length being substantially greater than said fourth length when the hose is in said first position.

15. The hose for ducting a fluid through a controlled bend of claim 13, wherein each pleat has a third length along said outer perimeter and a fourth length along said inner perimeter, said third length being substantially equal to said fourth length when the hose is in said second position.

16. The hose for ducting a fluid through a controlled bend of claim 13, wherein each pleat has a third length along said outer perimeter and a fourth length along said inner perimeter, said fourth length being substantially constant as the hose is bent between said first position and said second position.

17. The tubular hose for ducting a fluid through a controlled bend of claim 9, wherein both of said first and second hose ends are substantially straight.

* * * * *